May 3, 1960 W. S. PEARSON 2,934,981
METHOD AND APPARATUS FOR MAKING SEAMED TUBING
Filed May 29, 1956 3 Sheets-Sheet 1
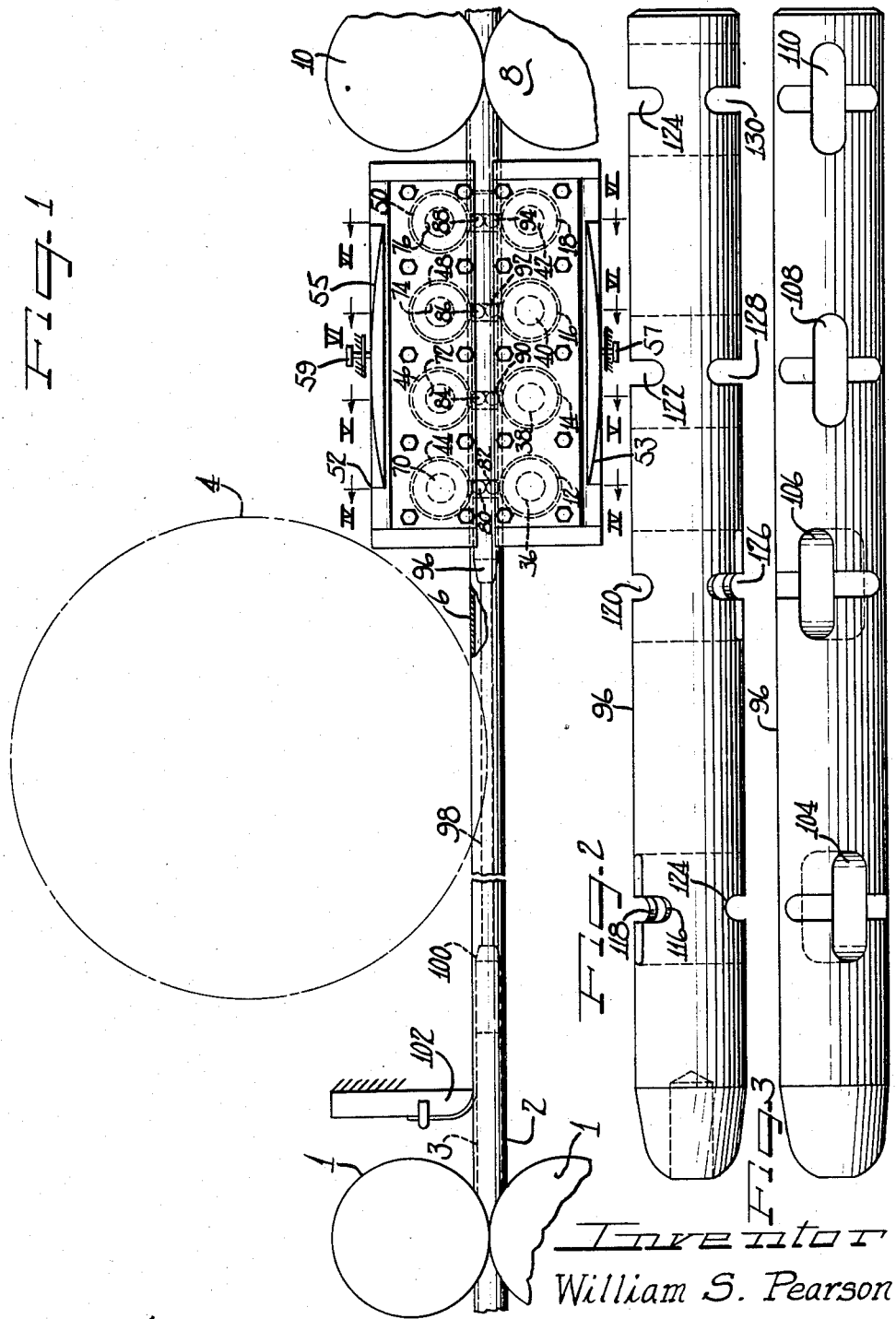
Inventor
William S. Pearson

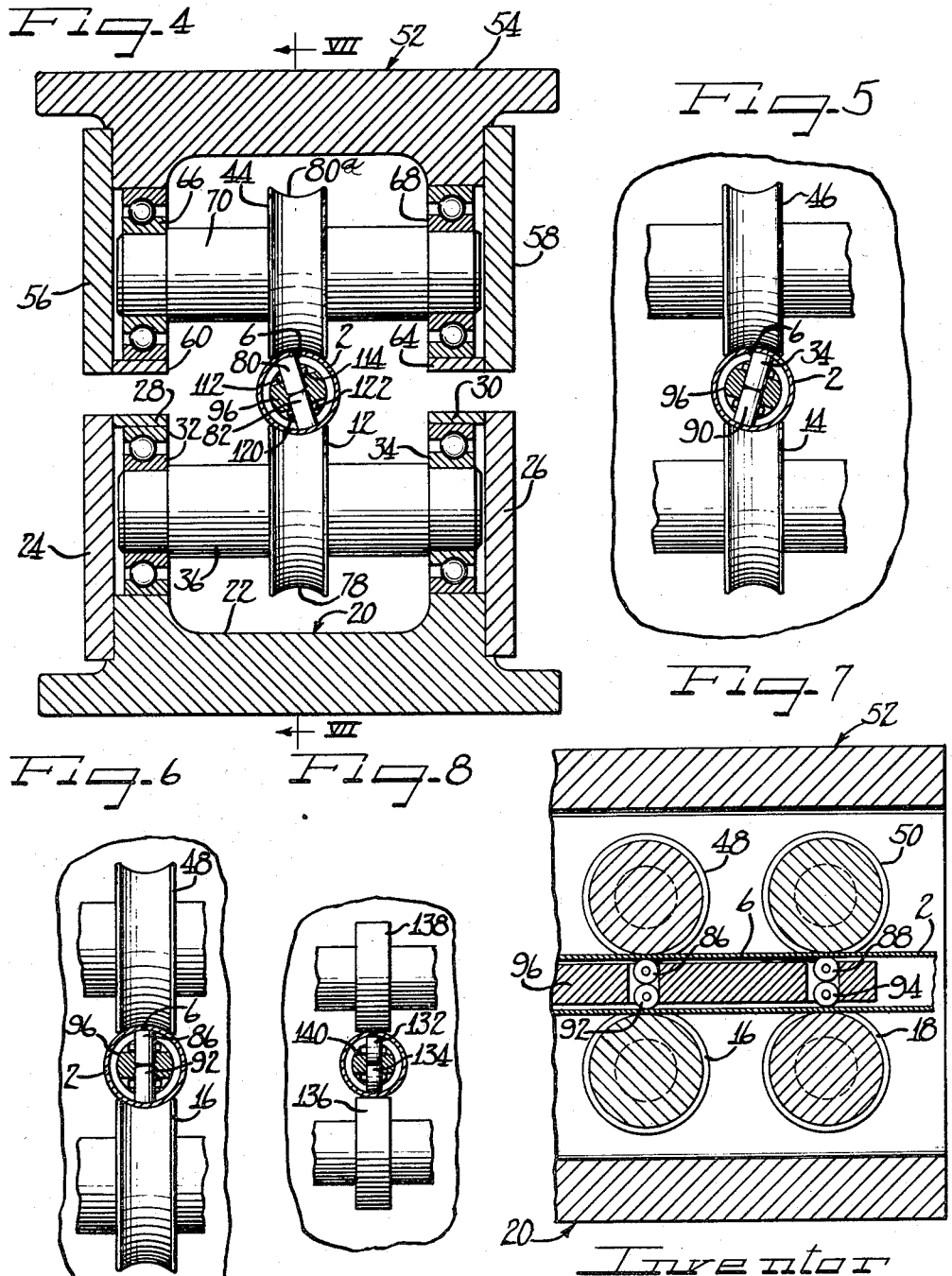

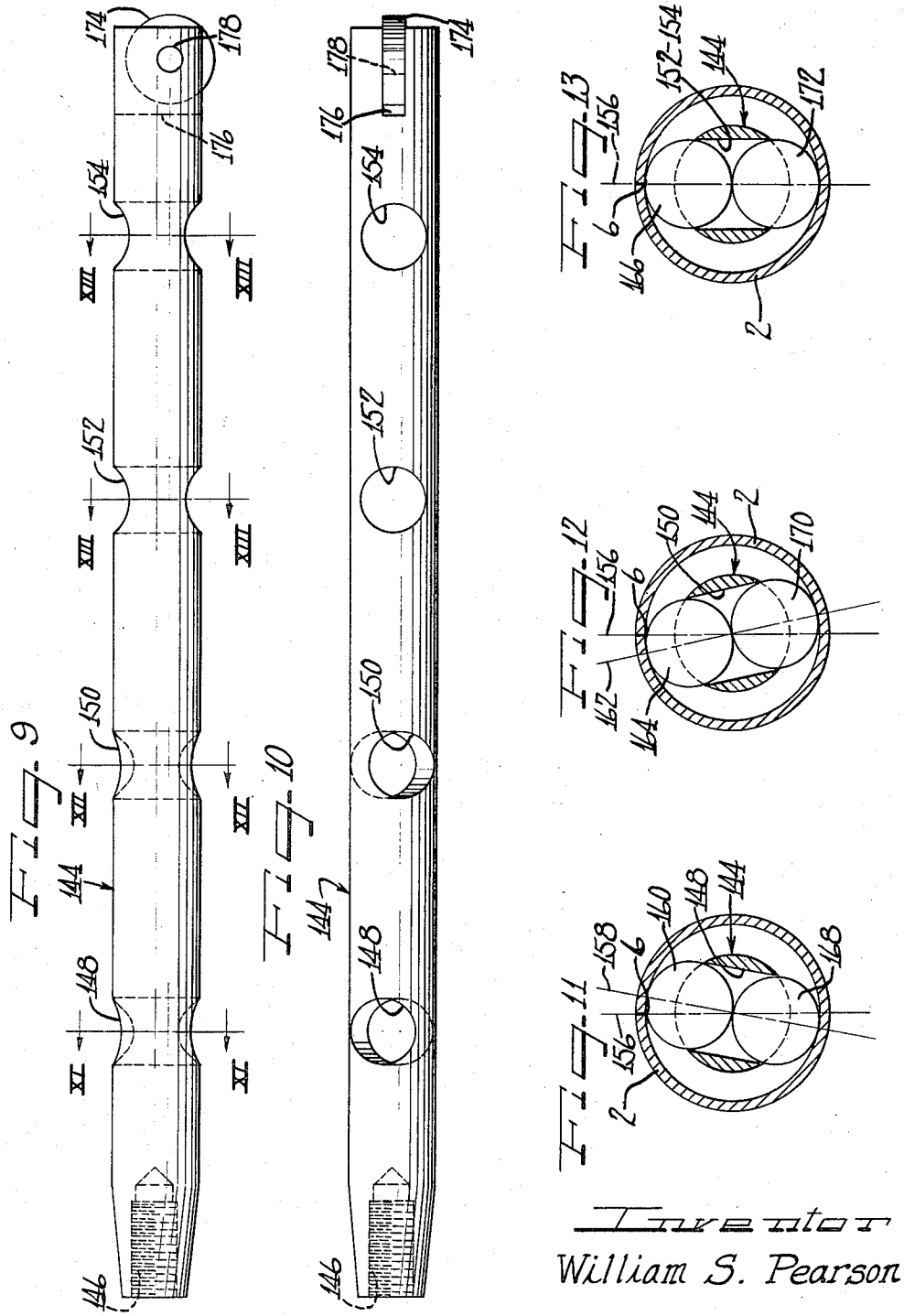

United States Patent Office 2,934,981
Patented May 3, 1960

2,934,981

METHOD AND APPARATUS FOR MAKING SEAMED TUBING

William S. Pearson, Baltimore, Md., assignor to Clifton Conduit Corporation, Baltimore, Md., a corporation of Maryland Application May 29, 1956, Serial No. 588,048

3 Claims. (Cl. 80—62)

The present invention relates to a new and improved method and apparatus for making continuous longitudinal welded seamed tubing and particularly relates to a method and an apparatus for smoothing the welded seam free of burrs and excess weld material and working the welded seam.

In the manufacture of making continuous longitudinal seam welded tubing, a strip of sheet metal of a width predetermined according to the diameter of the tubing to be manufactured, is bent and formed into a tubular configuration by shaping the strip to the predetermined diameter of the tubing with the longitudinal edges in close proximity to each other. The slot or cleft between the edges is then welded and closed by feeding the tubing to a welding head of any one of several well known varieties, such as an oxyacetylene gas welding head or a resistance electric welding head or an electric arc welding head or a pressure welding head to weld the tubing closed and provide a seam along the juxtaposed longitudinal edges which previously formed a cleft or slot.

Welding by the use of any of these conventional welding mechanisms substantially invariably resulted in a welded seam with excess weld material, or flash or burrs etc., on either or both sides of the tubing at the welded joint and left the joint generally irregular and rough. For obvious reason it is highly desirable to have the welded joint smooth and, as nearly as practicable, conforming to the regular surface of tubing or other welded parts on both sides of the weld.

Heretofore various expedients have been employed in an endeavor to smooth the welded tubing and among such expedients have been rolling, hammering and scarfing devices. These devices have not generally produced as clean a joint as desirable and therefore have not obviated the problems with which the present invention is concerned.

Also, it is highly desirable to mechanically work a welded seam to provide it with increased strength and with a less brittle character. The usual practice to attain this end has been to hammer or peen the joint subsequent to the bur or flash removal operation and inasmuch as the cost of this additional stage has been quite great such a step has often been omitted with the result of the production of inferior tubing or other welded articles.

In producing the smooth welded tubing the production method is capable of working at high speeds turning out continuous lengths of tubing. It is therefore highly desirable that the mechanism for smoothing and working the weld seam of the tubing be capable of operating at the same speeds and not retard or slow the entire operation. Mechanism heretofore employed have encountered difficulties in operating at very high speeds in that a satisfactory smoothing job is not accomplished and displacement between the welded seam and the smoothing mechanism occurs with the forces and vibrations encountered at high speeds. Further a necessity for continuous adjustment and frequent replacement have been necessary in high speed operating mechanism making it necessary to improve this step in the operation of forming the smooth tubing if high speed operation of this entire mechanism is to be accomplished.

By the present invention the above problems are substantially obviated. The present invention provides a method and a mechanism for smoothing the welded seam of the tubing or other welded article in a new and improved manner and for working the seam to give it added strength and ductility in a single operation thereby providing a substantial economic advantage over the heretofore known systems.

It is an object of the present invention to provide a method and apparatus for smoothing a welded seam which is capable of simultaneously working and smoothing the seam and of working at extremely high speeds without the need of adjustment or frequent repair.

It is another object of the invention to provide a method and apparatus which is capable of use with continuous tube forming and seaming mechanism and operates to continuously smooth and work the weld to complete the tubing.

Another object of the invention is to provide a smoothing and working mechanism which applies a progressive smoothing pressure to the center of the weld and in which the danger of the smoothing mechanism of being forced to one side of the weld is completely obviated.

Another object of the invention is to provide a smoothing and working mechanism which will operate to finish a weld formed on the inside surface of a tube.

Another object of the invention is to provide a seam smoothing and working mechanism formed of a plurality of smoothing wheels with an improved interior for supporting and operating the wheels within the tubing.

A still further object of the invention is to provide a series of seam smoothing and working wheels for operating within the interior of a length of tubing with improved backing and supporting mechanisms for holding the wheels in contact with the weld.

Another object of the invention is to provide a series of rollers arranged for metal working engagement with the seam in which certain of the wheels perform a multiple function of maintaining the remaining wheels in alignment with the seam as well as performing a smoothing and working operation.

Still another object of the present invention is to provide improved mechanism for progressively working and smoothing a continuous weld seam successfully removing the burrs and filling the depressions therein while working the weld material in a direction lateral of the seam to improve the appearance and the physical characteristics of the metal of the seam.

Other objects and advantages will become more apparent in the following detailed description of the invention as contained in the specification, claims and appended drawings in which:

Figure 1 is a side elevational view of a preferred embodiment of the invention partially in schematic illustrating improved forming, welding, smoothing and working mechanism;

Figure 2 is a side elevational view of the mandrel for rotatably supporting the smoothing and working rollers as well as the backing rollers;

Figure 3 is a plan view of the mandrel of Figure 2;

Figure 4 is a sectional view taken along line IV—IV of Figure 1 and used to illustrate the canted position of the first working and smoothing roller within the tubing;

Figure 5 is a sectional view taken along lines V—V of Figure 1 and shown to illustrate the position of the smoothing and working rollers of the second station;

Figure 6 is a sectional view taken along either of the lines VI—VI of Figure 1;

Figure 7 is a sectional view taken along line VII—VII of Figure 4 to show the relationship of the various rollers to the tubing;

Figure 8 is a vertical sectional view through the tubing at a working station and illustrating an alternate roller shape;

Figure 9 is a side elevational view of a mandrel used in an alternate embodiment;

Figure 10 is a plan view of the mandrel of Fig. 9; and

Figures 11, 12, and 13, are sectional views taken through the mandrel along lines XI—XI, XII—XII, and XIII—XII respectively, but having the welded tubing and smoothing and working balls added to the views.

The present invention is especially susceptible of use in forming continuous tubing by progressively shaping sheet metal strip material into tubular form and welding across the slot or cleft on the inner side of the tube between juxtaposed edges of the material to join the same in a longitudinal seam and thus form a continuous welded seam tube. It should be noted however that although the present invention will be described in such a setting as the preferred embodiment, the principles and concepts of the present invention are susceptible for use in the manufacture of any item having a welded seam therein.

A machine for forming and welding continuous welded seam tubing and employing the principles and concepts of the present invention is schematically illustrated in Figure 1. Cooperating sets of form rollers 1—1 (only one set being illustrated) are provided to properly shape a continuous strip of weldable sheet material into tubular form 2 with a substantially straight cleft or slot 3 between the longitudinal edges of the strip material which are positioned in close proximity.

In the showing of Figure 1, this cleft or slot 3 is formed at the top of the tubing 2 but it should be understood that the slot or cleft may be in any relative position about the tubing with equal effectiveness for the purposes of the present invention. The particular material of which the tubing is constructed, although herein described as sheet metal strip material as a preferred material for the purposes of the present invention, may be any weldable material such as any metal or alloy or a mixture or any of the weldable synthetic materials or any other weldable material.

The sets of form rollers 1, other sets of which may be provided along the tubing forwardly of the position of the weld head 4, form the continuous strip of sheet metal into a tubular configuration by bending and working the same, and drive the so-formed tubing forwardly past a welding head or welding mechanism 4. The welding head mechanism 4 produces a welded seam 5 along the cleft or slot 3 of the tubing to close the tubing and circumferentially seal the same. The substantially straight longitudinal seam weld 6, as will be seen in the broken away section of Figure 1 of the tubing is formed on the inner surface of the tube. This weld may be a lap weld or a butt weld or fill weld as desired depending upon the character of the welding medium selected and the form rolls employed. It will be recognized by those skilled in the art that a mechanism employing the principles and enjoying the advantages of the present invention may also be provided to work and smooth a seam formed instead on the outer surface of the tubing.

Following the welding mechanism 4 and arranged along the tubing are a series of working stages wherein the weld material is successively worked and flattened from different directions into different configurations to finally emerge as a smooth flattened weld seam devoid of pits and crevices and with the burrs and rises removed and flattened. The working stages are stationary with respect to the welding mechanism and to the forming mechanism for the tubing and thus the tubing is driven through the apparatus in its entirety at a relaively high rate of speed to emerge as a completed smooth finish tubing. After the tubing finishes passing through the working and smoothing stations it passes into a pair of conveying rollers 8 and 10 positioned below and above the tubing to support it and to carry outwardly of the machine.

Each of the smoothing and working stations consists of a plurality of rollers with their axes in vertical alignment so as to engage the tubing in opposition to each other in the common vertical plane of the roller axes. As operative in the vertical plane, the rollers will perform a smoothing and working as well as a supporting and backing function and the active and reactive forces will all be along the vertical plane as defined by the axes of the rollers.

At each successive working station, as will be shown by the successive sectional views IV, V and VI all taken from Figure 1, there are located sets of similar rollers with the rollers critically positioned with respect to the weld bead within the tube in order to perform a specific function with respect to the weld bead. The respective functions of these successive groups of rollers will be explained in connection with each of the successive sectional views as shown in Figures 4, 5 and 6.

The lower rollers which are positioned beneath the tubing 2, one at each working station, are axially arranged along the tubing at each of the four smoothing and working stages and function to support the tubing and act as supporting members for the backing rollers within the tubing. The supporting rollers are shown at 12, 14, 16 and 18 and are each rotatably carried in the support 20 as may be seen in the detailed view of Figure 4. The lower carrier 20 for the support rollers 12 through 18 consists of a yoke member 22 which extends across below the rollers. Secured to each side of the yoke member are vertical side plates 24 and 26 which are provided with inwardly extending elongated flanges or bearing retaining members 28 and 30 at their upper edges. The combination of the yoke member 22 the side members 24 and 26 with the flanges 28 and 30 provide a means for retaining the races roller bearings 32 and 34 in which the supporting rollers are journaled.

The supporting rollers 12 through 18 are each rotatably carried on shafts numbered 36 through 43 respectively. The shafts are journaled at their ends in the inner races of the ball bearings 32 and 34. The ball bearings are provided to make the supporting rollers freely rotatable as the tube is moved therealong and this is true of the other pressure bearing rollers which are located above the tubing.

The pressure bearing rollers as shown in Figure 1 are numbered 44 through 50. The pressure bearing rollers are carried in a support 52 which is similar to the support 20 as is shown in Figure 4. The support 52 has an upper yoke member 54 with side plates 56 and 58 attached to the sides with each of the side plates provided with a longitudinal flange 60 and 64 to hold the outer races of ball bearings 66 and 68 shown in Figure 4. The pressure bearing rollers, as shown by the roller 44 in Figure 4, are supported on a shaft such as 70 which is secured to the inner race of the ball bearings for easy rotation of the roller. The rollers 46 through 50 are similarly supported on shafts 72 through 76 as is shown in Figure 1.

In Figure 4 it will be seen that the tubing 2 is firmly carried between the tube support roller 12 at the bottom of the tube and the pressure bearing rollers 44 at the top of the tube. Each of these rollers is provided with a rounded groove or depression 78 and 80 which conforms to the peripheral contour of the tubing 2 so as to provide a firm support and bearing for the tube. Each of the successive tube supporting rollers 12 through 18 and each of the successive pressure bearing rollers 44 through 50 have the same curved groove to fit the contour of the tubing as will be seen in Figures 4 through 6.

The complete set of rollers at each of the working stations of the seam smoothing mechanism consists of four rollers. Beneath the tubing is the tube supporting roller as shown at 12 in Figure 4. Above the tubing is the pressure backing roller 80a. Within the tubing is the smoothing and working roller 80 and beneath it the backing roller 82. As will be seen in Figure 4 the smoothing and working roller and the backing roller form a team to extend completely across the diameter of the tubing 2 to be wedged tightly therein and to roll in peripheral contact with each other and with the inner wall of the tubing as the tubing is moved along relative to the rollers. The rollers are substantially the size of the tubing. The tubing will be prevented from being distorted in shape from the rollers within the tubing since pressure of the supporting rollers 12 beneath the tube and the pressure bearing rollers 80 above the tube continue to hold the tube in circular configuration.

The smoothing and working rollers are located at each of the working stations with certain of the rollers engaging a different portion of the weld bead 6 to smooth and work the bead into a desired configuration which conforms to the smooth circular interior of the tube 2. The series of smoothing and working rollers at the succeeding stations along the tube are numbered 80, 84, 86 and 88. The cooperative mating backing rollers for the smoothing and working rollers are numbered 82, 90, 92 and 94.

At the first station, as indicated by the section IV—IV of Figure 1 and as illustrated in Figure 4, the smoothing and working rollers 80 and backing rollers 82 which are positioned in back to back position with their axes lying in parallel planes and are canted slightly to the left of vertical so that the edge of the smoothing and working roller will engage and flatten only one side of the weld bead 6. It is to be noted that the smoothing and working rollers as well as the backing rollers have crowned outer surfaces so as to fit the internal configuration of the tubing and to press in line engagement instead of point engagement against the inside of the tubing applying a pressure thereto without defacing or deforming the natural curved inner surface of the tubing.

The smoothing and working roller engaging the weld bead laterally with its right edge as shown in the drawing of Figure 4 smooths and works the left side of the weld bead removing the hollows and depressions therein and forcing the access weld material and burrs into the configuration of the interior of the tubing. The material that is not pushed down against the inner face of the tubing is forced toward the center of the seam to form a slightly raised ridge. Therefore the edge of the roller will ride against this ridge and there is no chance that it will slide to the right but instead is firmly and positively guided by the weld bead itself.

It will be seen from Figure 5 which is section taken along line V—V at the next working station, that the next smoothing and working roller 84 and the backing roller 90 are canted to the right to engage the right side of the seam 6 lateral of the seam and from a direction opposite that of the roller of Figure 4. This flattens the right side of the seam forcing the excess metal into the configuration of the tubing and closing the hollows and pits and depressions which occur in the weld bead and removes the burrs and excess material to force it to conform to the smooth inner surface of the tubing. The small amount of worked metal is again pushed toward a ridge at the center of the bead. This ridge guides the roller and positively prevents it from crossing over the bead.

The metal which has been forced toward the center of the bead to form the ridge has been partially worked by the two smoothing and working rollers 82 and 84 which have successively engaged the bead from the laterally opposite directions. The ridge is next successively engaged by a series of tube flattening and working rollers 86 and 88 which engage the weld bead directly from the center to rework the portion of the bead material and flatten the bead working the excess material toward the already smoothed lateral portions. The action of the center smoothing roller 86 as shown in detail in Figure 6. The roller 86, which is the third working and smoothing station along the tubing, substantially flattens the weld seam or bead 6 towards the contour of the inner surface of the tubing and the successive smoothing roller 88 is positioned after the roller 86 to add an additional finishing smoothing operation. If desired the smoothing and working roller 86 may be of slightly smaller diameter than the roller 88 so that the final flattening and smoothing work at the center of the bead is divided therebetween. Thus the first roller 86 will assume only half of the flattening and smoothing load and the remainder of the job will be performed by the final roller 88.

It will be noted from Figure 5, that after the two rollers 80 and 84 which engage the seam 6 laterally there is a ridge or bead at the center of the weld seam. There is also the original metal of the weld bead on the inner surface of the tubing. There is a strong tendency especially at high speed operation for the smoothing and working rollers to slip or be forced to one side of the central ridge or to push the tube or twist the tube so that the seam will pass to one side of the roller. This of course would create an unsatisfactory smoothing and working operation. Therefore, the present invention encompasses apparatus which will insure that the centrally located smoothing working rollers, as are illustrated in the last two stages of the smoothing and working mechanism, will remain directly in the center of the weld seam without deviating to the side. For this purpose the rollers at the forward stations 80 and 84 function not only to provide a preliminary working of the seam but also function to provide a restraining mechanism that will positively insure that the following rollers will remain in the center of the seam.

The series of smoothing and working rollers are each rotatably but rigidly attached to a central mandrel which is controlled in position and which in turn controls the position of each of the rollers. For controlling the position of the mandrel and preventing it from rotating about its longitudinal axis, the forward smoothing and working rollers 82 and 84 engage the seam 6 laterally with their shoulders pushing against only a portion of the seam to thereby form the central ridge as is illustrated on the drawings of Figure 4 and 5. Thus if the central mandrel 96 were to twist in either direction one roller would have to force itself past the remaining portion of the seam which is an impossibility. These two leading smoothing and working rollers therefore also act as guide rollers insuring that the following two rollers 86 and 88 will each remain centrally located with respect to the seam. Although in the present embodiment two leading rollers are used as guide members for holding the mandrel fixed and two following rollers are employed and it will be seen that a larger number of leading rollers may be used although the rollers must engage the seam from opposing sides. It will also be seen that the limited number of leading rollers can be used to guide and control a larger number of following smoothing and working rollers. The mandrel is made of metal and has a heavy body so that no twisting can occur to permit lateral deviation of the rollers.

The relative relationship of each of the rollers and their function may be best understood by viewing Figure 7. In this figure the supporting rollers 16 and 18 are shown positioned beneath the tubing 2 and the pressure bearing rollers 48 and 50 are shown above the tubing. The smoothing and working rollers 86 and 88 are shown engaging the seam 6 within the tubing. Directly below the smoothing and working rollers 86 and 88 are the backing rollers 92 and 94. Since the smoothing and working rollers 86 in cooperation with the backing rollers 92 extend across the full diameter of the tubing, the smoothing and working rollers must progressively flatten the seam 6 and force it to the diameter of the tube as they are moved along the tubing.

The tubing cannot distort or become egg shaped in cross section because of the supporting rollers 16 below the tubing and the pressure bearing rollers 48 above the tubing. The pressure bearing rollers are positioned directly opposite the seam and if any of the weld material projects or is forced through the seam the roller will flatten it to conform to the shape of the outside of the tubing. The relative position of the supporting rollers beneath the tubing, the pressure bearing rollers above the tubing and the smoothing and working rollers and backing rollers within the tubing is fixed with respect to the tube and with respect to each other so that they will always remain vertically opposite and act as a cooperative unit to work the metal of the seam.

The supports 20 and 52 for the supporting rollers and the pressure bearing rollers are suitably fixed in their location. They are held against the tubing by heavy leaf springs 53 and 55 adjustably forced against the supports by adjustable studs 57 and 59, which are suitably mounted. The spring leafs permit the rollers to pass over the ends of tubing without severe shock.

The rollers within the tubing are controlled in the position by the mandrel 96. To support the mandrel 96 in location within the tubing as the tubing is moved therealong, a cable 98 is attached to the lead end of the mandrel and is secured to a connector member 100 at the lead end of the cable. The connector member maintains the cable centrally located within the tubing and is itself held in its relative position within the tubing by a bracket 102 which is suitably fixed and which extends through the gap or cleft in the tubing ahead of the welding mechanism 4.

The mandrel 96 is cylindrical in shape with vertically extending slots 104, 106, 108, 110 projecting therethrough for containing the smoothing and working and the backing rollers. The first two slots 104 and 106 are cut at an angle or canted with respect to the vertical plane so as to hold the rollers in positions canted in alternate directions as shown in Figures 4 and 5. Each of the rollers is provided with small hubs such as the roller 80 being provided with hubs 112 and 114, Figure 4, to rotatably support the roller in the journal slots 116 and 118 as is shown in Figure 2. The backing wheel is provided with similar axial hubs 120 and 122, Figure 4, which are journaled in the opposing slots with one of the slots 124 being shown in Figure 2.

Similar hubs are provided for each of the smoothing and working rollers and for the backing rollers to be journaled in the slots in the mandrel 96 is a similar manner and these need not be described in detail. The succeeding smoothing and working rollers 84, 86 and 88 are rotatably carried in the journal slots 120, 122 and 124 respectively of the mandrel. The backing rollers 90, 92 and 94 are rotatably carried in the journal slots 126, 128 and 130 of the mandrel.

In some instances such as when very small tubing is being formed as illustrated in Figure 8, the smoothing and working rollers 132 and the backing rollers 134 may be flat across their peripheral surface rather than crowned as the rollers with larger tubing. The supporting rollers 136 and the pressure bearing rollers 138 may also be flat since with tubing this small flat roller will form a smooth worked bead of satisfactory configuration. With the use of these flat rollers the same arrangement of a plurality of smoothing working stations will be used and the rollers may be carried in a mandrel 140 similar to the mandrel described in connection with Figures 1 through 7.

An important embodiment of the invention is shown in detail in Figs. 9 through 13. In the arrangement illustrated the tubing is formed and welded in the same manner as described in connection with the previous embodiments but the tube smoothing and working members are in the form of hardened spherical balls. These balls are arranged to be longitudinally held by a mandrel or support and will engage the seam within the tubing from different angles so that the sides of the seam are first worked and the center is subsequently worked and smoothed. The balls have been found to be very advantageous for this use for a number of reasons. An excellent seam material working operation is obtained in that the balls first engage the seam material in a point, as they roll forward along the seam, and this point contact spreads as the balls progress until the contact has spread to the width of the broadest part of the engagement between the ball and the seam. This progressively works the material and fills the indentations and crevices. The balls are also highly satisfactory in that they will rotate in their carrier to continually present a different smoothing and working surface and will use their entire surface thereby extending the wearing life of the seam smoothing surface. The balls are also very satisfactory in that the rolling resistance is at a minimum between the balls and the carrier so that a true rolling engagement is effected between the balls and the seam. The balls are very inexpensive to purchase and standard commercial balls of the proper hardness can be utilized without the necessity of manufacturing special members.

With reference to the embodiment disclosing the preferred form, Fig. 9 shows the holder or mandrel for supporting the balls and moving them longitudinally along the seam within the tube. Fig. 10 illustrates a top view of this mandrel with Figs. 11, 12 and 13 showing the relative angular position of the bore holes for supporting the balls.

The mandrel 144 is an elongated cylinder with an axial hole 146 at the lead end which may contain threads for connecting an anchoring member to hold the mandrel stationary within the tube as the tube is moved along past the seam working and smoothing stage. The anchoring member for holding the tube may be similar to that shown at 98 in Fig. 1 for that form of the mandrel. The mandrel is provided with a plurality of lateral bore holes shown at 148, 150, 152 and 154. These laterally extending bore holes are drilled in the mandrel to support the balls in a position to face the seam within the tubing. The holes are bored at different angles however, along the mandrel, so that the balls will engage different portions of the seam and progressively work the various areas to complete the smoothing and working of the entire seam. The vertical axis of the mandrel is shown at 156 in Figs. 11, 12 and 13, which illustrates the relative positions of the bored holes. The first hole 148 is bored or drilled at an angle or canted as shown by its axis 158. This causes the first seam working and smoothing ball 160 to engage the seam 6 at the right side of the seam as is shown in the drawing of Fig. 11.

The second bore hole 150 which is drilled through the mandrel 144 behind the first hole 148 is drilled at a radial angle which is at the opposite side of the vertical axis 156 as is shown by the axis 162 of the hole 150 in Fig. 12. This causes the second seam working and smoothing ball 164 to engage the seam 6 on the opposing side to smooth and work the other side of the seam. This of course causes a lateral reactance pressure between the ball and the mandrel in the opposite direction from that between the ball 160 and the mandrel so that the mandrel will not twist and turn to rotate about its axis and permit the balls to move away from the seam.

The last two smoothing and working balls 166 are held in the bore holes 152 and 154 and are positioned so that they will engage the direct center of the seam. The balls may be chosen so as to be of a size that the ball in the first hole 152 will partially complete the smoothing of the center portion of the seam and the second ball in the last hole 154 will finish the smoothing of the center of the seam. Since the mandrel is prevented from turning by the first two balls 160 and 164 engaging opposite sides of the seam, the latter balls 166 will be maintained directly in the center to complete their smoothing.

It is to be noted that each of the balls 160, 164 and 166 is held in material deforming pressure with the seam by a backing ball or a supporting ball which is located beneath it and which rolls against the opposing side of the tubing. A ball 168 is positioned beneath the smoothing and working ball 160 within the hole 148. This supporting ball 168 is held in position directly beneath the smoothing and working ball 160 along the axis 158 of the hole 148 so that the working ball 160 will be pressed in firm engagement with the seam. The two balls are in rolling contact with each other and as the tubing is moved relatively along past the mandrel the balls will rotate to perform their respective functions and will not only rotate about a horizontal axis but will vary their positions so that over a period of time the entire surface of the balls will have come into engagement with their mating surfaces thereby equalizing the wear over the entire surface of the balls. This is important to the prolonged operation of the working ball 160 and it will have a satisfactory smooth working surface for a long working life and will retain its operating diameter for a long working life. Also since the balls have rolling contact with each other there is very little frictional resistance and a good rolling contact will be had between the working ball 160 and the seam 6 to perform an improved smoothing operation.

The ball 164 is held against the seam 6 in metal deforming pressure by the supporting ball 170 which is rotatably positioned in the hole 150 beneath it. The balls 166 which are in the holes 152 and 154 are supported by supporting balls 172 which are positioned in the holes directly beneath the smoothing and working balls.

With this arrangement it may be seen that the mandrel is in floating position within the tube. In order to support the mandrel and prevent it from dragging along the base of the tube and to insure that it will equally engage both the smoothing and working balls and the supporting balls, a mandrel positioning member 174 is provided. This positioning member is shown in a preferred form as a rolling wheel journaled in a slot 176 in the tail end of the mandrel. An axle pin 178 projects through a lateral hole through the mandrel to rotatably support the wheel 174. Thus as the tube moves along relative to the mandrel, the roller or wheel 174 will roll along the base of the tube and support the mandrel in spaced position from the tube walls.

Although the operation of the various elements of the mechanism will now appear clear from the foregoing description a general summary of the overall operation of the mechanism will be useful. The tubing 2 is first fed through forming rollers shown at 1 which form the material into a cylindrically shaped tube bringing the opposite edges of the material into juxtaposed position with a slot or cleft therebetween. The material then passes through the welding mechanism 4 which in the embodiment illustrated forms a weld seam 6 bridging the slot and projecting into the inside of the tubing. The welded tubing then passes through a series of smoothing and working stations each consisting of a group of strategically positioned rollers. At the first station which is shown in section in Figure 4, the tube is supported by a roller 78 which is located beneath the tubing and supported on top by pressure bearing roller 80 which is positioned opposite the weld bead 6. Within the tubing is a smoothing and working roller 80 which engages one side of the seam to smooth and flatten the raised metal bead working the metal progressively as the tubing is moved past the roller and pushing a portion of the worked metal into a ridge at the center of the bead. The smoothing and working roller is supported within the tube by a backing roller 82 both of which are carried on the mandrel 96. At the next working station, as shown in the detail of Figure 5, the smoothing and working rollers 84 and the backing roller 90 are canted in the other direction with respect to the tube so as to engage the weld bead 6 from the opposite direction and flatten the weld material forcing it into a centrally located ridge. The tube remains rigidly supported within the supporting roller 14 and the upper pressure bearing roller 46 which is located opposite the weld seam.

At the next station the smoothing and working roller 86 and the backing roller 92 are vertical so as to engage a seam directly to flatten and work the metal of the central part of the seam and flatten the ridge formed by the two previous rollers 80 and 84. The final working and flattening roller 88 also flattens and works the metal of the seam directly in the center of the seam similar to the roller 86 and this successive roller may be slightly larger than the roller 86 to complete the flattening and forming of the seam. The two rollers 86 and 88 which engage the seam directly will be held rigidly in the center of the seam since the supporting mandrel for the rollers is held rigid by the two leading rollers which laterally engage the seam. Further, the tubing will not twist so as to permit the seam to slide out from under the two last rollers since the seam is held by the two foremost rollers which hold the seam between them.

The same operation is performed with the embodiment illustrated in Figs. 9 through 13. In this case, the seam will be engaged and worked by the succession of balls 160, 164 and 166. Balls 160 and 164 will engage the seam in rolling contact from different sides of the seam, and the last two balls 166 will successively work the center of the seam.

The embodiments present a seam smoothing and working apparatus which is capable of operation at high speeds, and will operate over long periods of time requiring no adjustment.

It will thus be seen that I have provided an improved mechanism for working and flattening the metal of the seam of a continuous tubing which meets the advantages and objectives herein before set forth. Although the mechanism is shown and described as flattening a seam formed on the interior surface of the tubing it will be seen that the principles of the invention can be utilized in flattening any type of seam and may be used on a seam formed exterior of the tubing and on seams formed in other metal objects such as piping conduit and the like.

The metal of the seam is given progressive working from both sides of the seam and certain portions of the metal are reworked when the center ridge formed by the lateral rollers or balls is flattened by the direct engaging rollers or balls. In addition to forming a seam of improved physical characteristics by the multiple working, the present arrangement insures that the seam will be adequately and completely flattened and is capable of use in a very high speed mechanism preventing the flattening rollers or balls from deviating to one side of the seam and insuring the forming of a complete perfect job. It will further be seen that in one form of the invention the mechanism uses smooth frictionless rollers which can be provided with heavy supports and bearings to be capable of a long operating life without sustaining wear that will place them out of adjustment. The parts can be made extremely rigid so as to be able to sustain the vibration and shocks that occur with high speed operation. In the other form long wearing inexpensive balls are used.

I have, in the drawings and specification, presented a detailed disclosure of the preferred embodiment of my invention, but it is to be understood that I do not intend to limit the invention to the specific form disclosed but intend to cover all modifications, changes and alternative constructions and methods falling within the scope of the principles taught by my invention.

I claim as my invention:

1. A method of working and smoothing a welded seam comprising continuously feeding the seam relatively to a smoothing and working stage, deforming a first incremental portion of the metal adjacent the centerline of the seam to a shape approaching the conformation of the desired smooth shape, subsequently deforming a second but laterally opposite to said incremental portion of the metal adjacent the centerline of the same seam to deform it for the first time toward the smooth seam shape desired, and subsequently deforming some of said first shaped portion and some of said second shaped portion of seam metal to the desired seam shape by working and smoothing the first and second said portions by pressure deforming the centerline of said incremental portion of the seam to improve the appearance and physical characteristics of the seam.

2. An apparatus for finishing a longitudinal continuous weld bead on the inside of a tube, comprising a rigid elongated mandrel adapted to be maintained by a cable in location axially along a tube parallel to a freshly formed internal weld bead thereon, a plurality of rollers spaced axially along said mandrel and rotatably carried on the mandrel for rotation about axes transverse of the tube, said axes each being at angles to each other, a first of said rollers positioned for engaging one side of the weld bead, a second of said rollers behind said first roller positioned for engaging the opposite side of the weld bead, a third roller positioned behind said first and second rollers and centered on said bead for flattening the bead, said first and second rollers by said engagement of the bead preventing turning of the mandrel with respect to the tube axis and holding the third roller centered on the bead, and individual backing members positioned opposite each of said rollers and ridable on the surface of the tube for preventing lateral displacement of the tube away from the rollers.

3. An apparatus for finishing a longitudinal continuous weld bead on the inside of a tube, comprising a rigid elongated mandrel adapted to be maintained by a cable in location axially along a tube parallel to a freshly formed internal weld bead, a plurality of hardened spherical balls spaced axially along said mandrel and rotatably carried on the mandrel for rotation about axes transverse of the tube, said axes each being at angles to each other, a first of said balls positioned for engaging one side of the weld bead, a second of said balls behind said first ball positioned for engaging the opposite side of the bead, and a third ball positioned behind said first and second balls on the center of the bead for flattening the bead, said first and second balls by said engagement of the bead preventing turning of the mandrel with respect to the tube axis and holding the third ball centered on the bead, and individual backing members positioned opposite to each of said balls and ridable on the inner surface of the tube for preventing lateral displacement of the tube away from the balls.

References Cited in the file of this patent

UNITED STATES PATENTS

| | | |
|---|---|---|
| 278,340 | Kellogg | May 29, 1883 |
| 1,799,607 | Lewis | Oct. 28, 1930 |
| 1,812,409 | Leckie | June 30, 1931 |
| 1,837,494 | Sessions | Dec. 22, 1931 |
| 1,884,467 | Windsor | Oct. 25, 1932 |
| 1,905,478 | Lutz | Apr. 25, 1933 |
| 1,922,800 | Gibson | Aug. 15, 1933 |
| 1,954,511 | Adams | Apr. 10, 1934 |
| 1,961,224 | Jones | June 5, 1934 |
| 1,964,407 | Phillips | June 26, 1934 |
| 2,025,422 | Park | Dec. 24, 1935 |
| 2,139,771 | Riemenschneider | Dec. 13, 1938 |
| 2,276,007 | Young et al. | Mar. 10, 1942 |